United States Patent [19]
Deal et al.

[11] Patent Number: 4,741,020
[45] Date of Patent: Apr. 26, 1988

[54] CLERK PAGING SYSTEM

[76] Inventors: Steven A. Deal, 6331 Anvil Lake Ave., San Diego, Calif. 92119; Richard Manning, 2794 Walker Dr., San Diego, Calif. 92123; Jeffrey Stevko, 10767 Jamacha Blvd. #128, Spring Valley, Calif. 92078

[21] Appl. No.: 5,128

[22] Filed: Jan. 20, 1987

[51] Int. Cl.$^4$ .................................... H04M 11/04
[52] U.S. Cl. .................... 379/67; 379/170; 379/217; 379/374; 340/311.1; 381/77
[58] Field of Search ............... 379/67, 87, 170, 162, 379/217, 374, 37, 57; 381/77, 82; 340/311.1, 287, 293

[56] References Cited

U.S. PATENT DOCUMENTS

| | | | |
|---|---|---|---|
| 3,798,672 | 3/1974 | Gregg, Jr. | 340/692 X |
| 3,974,338 | 8/1976 | Luzier et al. | 379/72 X |
| 4,107,464 | 8/1978 | Lynch et al. | 340/692 X |
| 4,288,789 | 9/1981 | Molinick et al. | 340/692 |
| 4,356,351 | 10/1982 | Shefler et al. | 379/88 |
| 4,357,493 | 11/1982 | Anderson et al. | 379/72 |
| 4,439,635 | 3/1984 | Theis et al. | 379/71 X |
| 4,455,548 | 6/1984 | Burnett | 340/293 |
| 4,545,043 | 10/1985 | Anderson et al. | 379/71 X |
| 4,682,348 | 7/1987 | Dawson et al. | 379/37 |

FOREIGN PATENT DOCUMENTS

| | | | |
|---|---|---|---|
| 2910479 | 9/1980 | Fed. Rep. of Germany | 379/217 |
| 0041859 | 3/1985 | Japan | 379/217 |
| 0117895 | 6/1985 | Japan | 379/67 |

OTHER PUBLICATIONS

Keefe et al, "Enhancement of a Radiation Safety System", IEEE Transactions on Nuclear Science, vol. NS-28, No. 1, Feb. 1981, pp. 643-645.
Anderson et al, "Mass Announcement Subsystem", The Bell System Technical Journal, vol. 60, No. 6, Jul.-Aug. 1981, pp. 1083-1108.
Shingler, "Design Considerations for the Intraplant Communications System", IEEE Power Eng. Soc. Meeting, Jul. 1978, pp. 1-7.

*Primary Examiner*—Jin F. Ng
*Assistant Examiner*—Matthew E. Connors
*Attorney, Agent, or Firm*—Laurance Banghart

[57] ABSTRACT

A clerk paging system for retail stores wherein a customer can push a "help" button on a call box, there being a call box in each department of the store, and the system automatically provides a stored, paging message to the store's existing paging system, including public address systems and radio systems, the message asking for help at the department in which the customer pushed the "help" button. The system automatically repeats the message with a preset time interval between messages, but only until a clerk pushes a "reset" switch on the same call box upon which the "help" button was pushed. To assist telephoning customers, clerks are paged using a two-part message. The first part of the message, typically a department name, is determined by a button pushed by the store's telephone operator. The system automatically determines the second part of the message, consisting of the telephone line number, by monitoring phone line status. A typical resulting message would be "Plumbing, Line Two". The system automatically repeats the message with a preset time interval between messages, but only so long as the customer is on the phone line waiting for service.

9 Claims, 1 Drawing Sheet

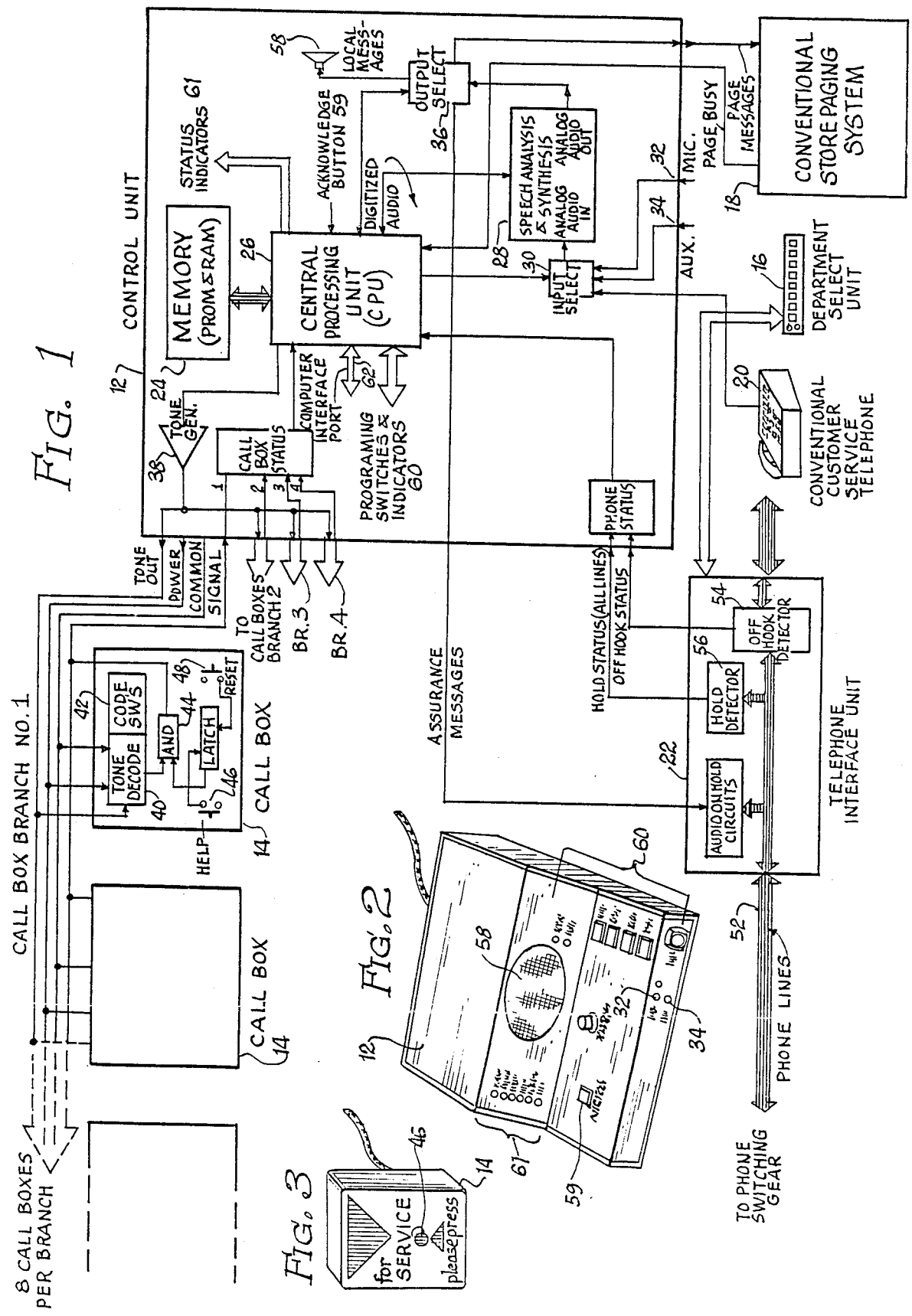

CLERK PAGING SYSTEM

BACKGROUND OF THE INVENTION

This invention relates generally to systems for paging clerks in a store, and more particularly for paging clerks who have specialized knowledge to help a customer who is either at a specific department in the store or is calling in on the telephone with questions relating to a specific department. The paging system of this invention drives the store's existing paging system, which conventionally includes a public address system with audio amplifier and many low-power loudspeakers. It may also include a radio system wherein clerks carry portable radio receivers with small loudspeakers, beepers, or alphanumeric displays.

Consider a customer standing in the plumbing department with a question about the plumbing components on sale there. He needs a clerk with plumbing knowledge to help him. One paging method in common use is to provide a "help" button that when pushed by a customer lights a light on top of a pole in the plumbing department. Sometimes a low power beeper on the pole also activates. The trouble with this system is that the clerk who should be paged is often out of visual and audio range of the pole, often in the diligent performance of his duties.

Other systems provide a "help" phone in each department so that the customer may call a general purpose customer service clerk at a customer service desk. U.S. Pat. No. 2,626,995 discloses a system combining a public address system with an intercommunication system between customer and customer service desk. Some systems have gone so far as letting the customer broadcast his own paging message.

These systems have proven ineffective. A majority of customers do not want to talk to a general purpose customer service clerk and are too bashful to want to broadcast their own paging message. In addition the store must fear that an occasional customer will make an improper broadcast.

When a customer telephones in to a store with questions relating to a specific department, conventional paging systems require the answering clerk on the multi-line system to put the customer "on hold" and use the store's public address system to page the appropriate clerk to answer the number of the line on which the customer is "on hold". The answering clerk, after performing these duties, goes on to answer another incoming call or perform other duties. All too often the clerk that was paged does not answer the phone and the customer eventually hangs up in disgust.

SUMMARY OF THE INVENTION

A major object of this invention is to provide a customer-initiated, automatic, clerk paging system for retail stores wherein a customer can push a "help" button on a call box, there being a call box in each department of the store, and the system automatically provides a stored, paging message to the store's existing paging system, including public address systems and radio systems, the message asking for help at the department in which the customer pushed the "help" button. The system automatically repeats the message with a preset time interval between messages, but only until a clerk pushes a "reset" switch on the same call box upon which the "help" button was pushed. This automatic re-page reinforces the urgency of the page resulting in decreased customer waiting time.

Another object of the invention is to provide a control unit that houses the stored messages and the electronic selection circuitry. The control unit interconnects with all of the call boxes, the store's existing paging system, and through a telephone interface unit, the incoming phone lines, a conventional customer service operator's telephone, and a department select unit yet to be described. The control unit also provides the system interface with entry of programming and preset information. A computer interface port is included such that activity data, waiting times, and associated data may be tabulated and reported.

Another object of this invention is to provide capability within the control unit to receive and store new and replacement messages from a microphone or other analog audio source, or through the computer interface port in digital form. When a microphone is used, a new message can be created when it is required, immediately becoming part of the message repertoire, and available for being automatically repeated as with any other message.

A major object of this invention is to provide the store's customer service telephone operator with a department select unit to select the department portion of a paging message after a customer has called in with questions relating to a specific department. The system automatically determines the remaining part of the message, consisting of the telephone line number, by monitoring phone line status. A typical resulting message would be "Plumbing, Line Two". The system automatically repeats the message with a preset time interval between messages, but only so long as the customer is on the phone line waiting for service.

Another object of this invention is to produce an alarm signal from the control unit at the customer service desk, the signal being energized after a paging message has been repeated a preset number of times. After the alarm signal is energized, the paging message will not be repeated again over the store's paging system but will be repeated over a control unit speaker after the customer service operator pushes an "acknowledge" button to listen to the unanswered page with the purpose of taking action to help the customer. The above sequence will occur regardless of whether the paging message is initiated by a "help" button or by the customer service operator.

Another object of this invention is to provide assurance messages to assure customers "on hold" that clerks with specialized knowledge are being paged.

BRIEF DESCRIPTION OF THE DRAWINGS

The invention will be better understood by reference to the following figures in which:

FIG. 1 is a block diagram of a clerk paging system in accordance with this invention showing a control unit, a plurality of call boxes, a telephone interface unit, and a department select unit, while conventional systems used are shown as they are interconnected;

FIG. 2 is a perspective view of a control unit in accordance with this invention; and FIG. 3 is a perspective view of one of a plurality of call boxes in accordance with this invention.

DETAILED DESCRIPTION

Referring now to FIGS. 1, 2, and 3, a control unit 121, a plurality of call boxes 14, a telephone interface unit 22, and a department select unit 16, all according to this invention, are shown connected to a store's conventional paging system 18 and a conventional customer service operator's telephone 20.

Within the control unit 12, the speech analysis & synthesis unit 28 takes in analog audio messages from an input select unit 30 under control of a central processing unit 26. The message may come from a microphone or auxiliary audio source by way of jacks 32 and 34 respectively, or from the conventional customer service operator's telephone 20. The analog audio message is transformed into digital data in the speech analysis & synthesis unit 28 and is then stored in the memory 24 by way of the central processing unit 26.

When a message is required to be used, the data is read from the memory 24 and sent by way of the central processing unit 26 to the speech analysis and synthesis unit 28 where the digital data is transformed back into an analog audio message. The analog message goes to an output select unit 36 which is under the control of the central processing unit 26. The message is either sent over the store's paging system 18, spoken over audio "on hold" lines in the case of assurance messages, or spoken over the speaker 58 on the control unit 12 with only the operator hearing the message.

The memory 24, the central processing unit 26, and the speech analysis & synthesis unit 28 are implemented with semiconductor integrated circuits not necessarily on a one-for-one basis. The function as shown can be provided by numerous semiconductor manufacturers. Each manufacturer has its own set, or sets, of circuits. Individual circuits are often proprietary, and are not generally interchangeable with circuits of another manufacturer. The manufacturers publish detailed application notes that enable a reasonably skilled technician to use their circuits, and sets of circuits.

In a preferred embodiment of this invention, the memory 24 includes eight EPROM circuits each with 256 thousand bits of information. The circuit, TMS27C256, is made by Texas Instruments. The memory 24 also includes twenty four dynamic RAM circuits each with 256 thousand bits of information. The circuit, TMS 4256, is also made by Texas Instruments. The speed analysis and synthesis unit 28 includes an MSM 5218 speed ADPCM circuit, an MSM 6912 low pass filter, and an MSM 5204 A/D converter. These three circuits are made by OK1 Semiconductor. The central processing unit 26 includes an 8088 microprocessor, an 8259A programmable interrupt controller, an 8254 programmable interval timer, and an 8284 clock generator. These four circuits are made by Intel.

Referring now to FIGS. 1 and 3, the control unit 12 is connected to the call boxes 14 in four branches, each branch with eight call boxes connected to four lines. Each call box is connected in the same way to the same lines within one branch. The central processing unit 26, through the tone generator 38, interrogates the eight call boxes in each branch by cycling through eight different frequency tones. The four branches are cycled concurrently. The tone decoder 40 in each call box 14, within a branch, is preset to respond to a different frequency tone with code switches 42.

The signal output from a call box 14 (that is from "and" gate 44) can only occur when the appropriate frequency tone is being received and the "help" button 46 has been pushed since the last time the "reset" switch 48 was pushed. In this way the central processing unit 26 monitors the "help"/"reset" condition of all 32 call boxes.

A designation of the appropriate message for each call box 14 is preset information. When a "help" button is pushed it will be detected in the control unit 12 on a certain signal line revealing the branch of the pushed button, while the frequency of the tone present reveals the call box within the branch of the button pushed. The appropriate message is selected and sent over the store's paging system 18.

The message will be repeated with a preset time interval between messages, but only until a clerk pushes the "reset" switch 48 on the same call box upon which the "help" button was pushed. the pushing of the "reset" switch will be detected as an absence of signal as indicated above. The operation of these sequences is programmed into the central processing unit 26 via the memory 24.

Referring now to FIG. 1, the control unit 12 is interconnected with the telephone interface unit 22, which in turn is connected to incoming phone lines 52, the department select unit 16 and the conventional customer service operator's telephone 20. When a customer calls in with questions relating to a specific department, the customer service operator pushes the appropriate button on the department select unit 16. The "off hook" detector 54 in the telephone interface unit 22 detects which telephone line the customer is on. The department selected along with the number of the line being used are transferred to the central processing unit 26 in the control unit 12. Based on these two information segments, the appropriate message is selected. A typical two part message would be "Plumbing, line 4". The message is actually sent to the store's paging system 18 only after the operator puts the customer "on hold".

The message will be repeated with a preset time interval between messages so long as the customer remains "hold". A clerk may pick up any phone instrument in the store, push the line 4 button on the phone taking the customer off "on hold", and talk to the customer. Should the customer hang up before being served, the line would also come off "on hold". The hold detector 56 in the telephone interface unit 22 detects line 4 coming off "on hold" status and the central processing unit 26 terminates the message sending.

After a paging message has been repeated a preset number of times, regardless of whether the paging message was initiated by a "help" button or by the customer service operator. The system automatically sends an alarm signal over a loudspeaker 58 mounted in the control unit (12 of FIGS. 1 and 2). The alarm signal is not sent over the store's paging system. It is intended only for the customer service operator who has the purpose of taking action to help the customer. When the operator hears the alarm, he or she pushes on "acknowledge" button 59 on the control unit (12 of FIGS. 1 and 2). The system sends the unanswered paging message again but only over the loudspeaker 58 in the control unit 12 so that the operator can identify the particular message that has remained unanswered.

The control unit 12 provides programmability of the various system parameters. Programming switches and indicators 60 are seen in FIG. 2 and operate unit control of the central processing unit 26 of FIG. 1. Similarly status indicators 61 are under control of the central processing unit.

The control unit, 12 of FIG. 1, provides a computer interface port 62 such that activity data, waiting times, and associated data may be tabulated and reported. New and replacement messages in digital form may also be transmitted through this port.

While the thrust of this description has been with stored-speech, paging messages, other forms of message such as audible beeps or alphanumeric displays are clearly included. The innovation and novelty of this invention, as expressed in the claims, are not limited to the embodiments described here, and a person skilled in the art can readily apply them with advantage to other embodiments.

What we claim is:

1. A method for paging over a store's conventional paging system, the paging message being activated by a customer, the message calling for an appropriate clerk to go to the customer's location to assist the customer, the method comprising:
   a. activating a "help" switch button on a call box by a customer;
   b. selecting by electronic means a stored, paging message that asks for assistance at the customer's location;
   c. sending said selected, stored message over the store's paging system;
   d. repeating said message with a preset time interval between messages;
   e. activating a "reset" switch on said call box by a clerk arriving at the customer's location; and
   f. discontinuing the message sending.

2. An improved clerk paging system for sending messages over a store's conventional paging system, wherein the improvement comprises:
   a. stored, paging messages contained with a control unit;
   b. a plurality of "help" switch buttons for customer use in activating paging messages, each switch button located on a call box, each call box located in a different department in the store;
   c. electronic means within the control unit to select the message assigned to the activated "help" switch button, the message relating uniquely to the particular "help" button activated and thus the location of the call box and the identification of the department in the store;
   d. electronic means within the control unit to drive the store's paging system with said selected, stored message;
   e. electronic means within the control unit to repeat the message with a preset time interval between messages; and
   f. a plurality of "reset" switches, one mounted on each call box for the exclusive use of a clerk on arriving at the customer's location, activation of a switch causing said repeating electronic means to discontinue message sending.

3. A clerk paging system according to claim 2 further comprising:
   a. electronic means within the control unit to produce an alarm signal from the control unit at a customer service desk, the signal being energized after a paging message has been repeated a preset number of times; and
   b. electronic means within the control unit to repeat said paging message over a control unit speaker after said alarm has occurred and the operator at the customer service desk has pushed on "acknowledge" button on the control unit.

4. A clerk paging system according to claim 2 further comprising electronic means within the control unit to receive and store new paging messages from microphone and auxiliary inputs of the control unit.

5. An improved clerk paging system for sending messages over a store's conventional paging system, wherein the improvement comprises:
   a. stored, paging messages contained within a control unit;
   b. electronic means, interconnected with a store's conventional multiline telephone system, that monitors the "off hook" status of a customer service operator's phone, the "on hold" status of each phone line, and the depression of any of a plurality of buttons on a department select unit pushed by the customer service operator, each button relating to a different department in the store;
   c. electronic means within the control unit to select the message containing the department selected at the department select unit and the number of the telephone line presently "off hook" at the customer service operator's phone;
   d. electronic means within the control unit to drive the store's paging system with said selected, stored message;
   e. electronic means within the control unit to repeat the message with a preset time interval between messages; and
   f. means to initiate the discontinuance of the message sending.

6. A clerk paging system according to claim 5 wherein the means to initiate discontinuance of the message is the electronic detection of the telephone line designated in the message coming off "on hold" status.

7. A clerk paging system according to claim 5 further comprising:
   a. electronic means within the control unit to produce an alarm signal from the control unit at a customer service desk, the signal being energized after a paging message has been repeated a preset number of times; and
   b. electronic means within the control unit to repeat said paging message over a control unit speaker after said alarm has occurred and the operator at the customer service desk has pushed an "acknowledge" button on the control unit.

8. A clerk paging system according to claim 5 further comprising electronic means to provide periodic assurance messages to all lines in an "on hold" status.

9. A clerk paging system according to claim 5 further comprising electronic means within the control unit to receive and store new paging messages from microphone and auxiliary inputs of the control unit.

* * * * *